(12) United States Patent
Manz

(10) Patent No.: US 11,666,067 B2
(45) Date of Patent: Jun. 6, 2023

(54) DEVICE AND METHOD FOR CRUSHING DEEP-FROZEN FOODSTUFFS PROVIDED IN BLOCK FORM

(71) Applicant: PACOTRADE AG, Zug (CH)

(72) Inventor: Roland Manz, Hägendorf (CH)

(73) Assignee: PACOTRADE AG, Zug (CH)

( * ) Notice: Subject to any disclaimer, the term of this patent is extended or adjusted under 35 U.S.C. 154(b) by 0 days.

(21) Appl. No.: 17/040,139

(22) PCT Filed: Apr. 20, 2018

(86) PCT No.: PCT/CH2018/000016
§ 371 (c)(1),
(2) Date: Sep. 22, 2020

(87) PCT Pub. No.: WO2019/200490
PCT Pub. Date: Oct. 24, 2019

(65) Prior Publication Data
US 2021/0022365 A1    Jan. 28, 2021

(51) Int. Cl.
*B02C 18/18* (2006.01)
*A23G 9/22* (2006.01)

(52) U.S. Cl.
CPC .............. *A23G 9/224* (2013.01); *B02C 18/18* (2013.01)

(58) Field of Classification Search
CPC . F25C 5/046; F25C 5/12; A23G 9/224; A23G 9/285; B02C 18/18
USPC .................................................. 241/DIG. 17
See application file for complete search history.

(56) References Cited

FOREIGN PATENT DOCUMENTS

| DE | 3211094 A1 | * | 11/1982 | |
|---|---|---|---|---|
| EP | 0 062 805 A2 | | 10/1982 | |
| EP | 0062805 A2 | * | 10/1982 | ............... A23G 9/20 |
| ES | 1 071 424 U | | 2/2010 | |
| ES | 1071424 U | * | 2/2010 | |
| KR | 20140002647 U | * | 5/2014 | |
| WO | 97/36498 A1 | | 10/1997 | |
| WO | WO-9736498 A1 | * | 10/1997 | ............... A23G 9/22 |
| WO | WO-2017102993 A1 | * | 6/2017 | ................ F25C 5/12 |

OTHER PUBLICATIONS

Machine translation of DE 3211094A1, Retrieved from Espacenet Jun. 24, 2022, 9 Pages. (Year: 1982).*
ISR for International Application PCT/CH2018/000016.
(Continued)

*Primary Examiner* — Faye Francis
(74) *Attorney, Agent, or Firm* — Ladas & Parry LLP

(57) ABSTRACT

A device for shredding deep-frozen food products provided in block form comprises a tool which is rotated around an axis of rotation (X) and advanced towards the block, thereby scraping off layers from the block. The device comprises two drive motors for generating rotational and feed movements of the tool, which can be controlled separately, at least one being of variable-speed. The device also includes a gear arrangement coupled to the drive motors in such a way that only one of the drive motors rotates the tool and other drive motors together serve to feed the tool, in a way that at a certain rotational speed ratio of the two drive motors the tool is rotated without axial movement of the latter and, at other rotational speed ratios advancing or retracting movement of the tool along the axis of rotation (X) occurs.

12 Claims, 2 Drawing Sheets

(56) References Cited

OTHER PUBLICATIONS

Written Opinion for International Application PCT/CH2018/000016.
WO 97/36498 A1 English Translation.
EP 0062805 A2 English Translation.
ES 1 071 424 U English Translation.

* cited by examiner

DEVICE AND METHOD FOR CRUSHING DEEP-FROZEN FOODSTUFFS PROVIDED IN BLOCK FORM

RELATED APPLICATION

This application is an application under 35 U.S.C. 371 of International Application No PCT/CH2018/000016 filed on 20 Apr. 2018, the disclosures of which are incorporated in their entirety by reference herein.

TECHNICAL FIELD

The invention relates to a device for shredding, in particular pureeing or pacotizing, of deep-frozen food products provided in block form as well as to a method for operating such a device according to the preambles of the independent patent claims.

BACKGROUND ART

Generic devices for shredding of deep-frozen food products provided in block form are used for the production of creamy or foamy food product preparations, such as e.g. mousses, farces, flavor concentrates, pastes, sauces, soups, ice cream or sorbets, and today professional gastronomy would be unthinkable without them.

The beginnings of such devices date back to the Swiss engineer Wilhelm Maurer, who in the 1980s, in his search for the ultimate ice cream machine, invented a new process for processing deep-frozen food products, in which finest layers are scraped off a block of food products frozen to −22° C. without thawing the scraped material. Today, this process is also known as "Pacotizing", in reference to the commercial product "Pacojet" developed specially for its execution by the Swiss company Pacojet AG, Zug.

EP 0 062 805 A2 shows the original version of the soft ice cream maker developed by Wilhelm Maurer, in which fine layers are scraped off a block-shaped frozen ice cream base material by means of a rotating knife, whipped and mixed with air under overpressure. This soft ice cream machine comprises a single drive motor which serves both to drive the rotation of the knife and to advance it. For this purpose, the blade shaft carrying the knife is supported in an axially displaceable manner and it is centrally penetrated by a threaded spindle which is supported in an axially stationary. The blade shaft and the threaded spindle are coupled together via the thread of the threaded spindle in such a way that a rotation of the threaded spindle relative to the blade shaft causes an axial displacement of the blade shaft. In operation, the blade shaft is driven-directly by the motor, while the threaded spindle is driven by the motor through a gearbox, such that it can be driven at different rotational speeds to produce an axial movement of the blade shaft. This generic device, however, has the disadvantage that the knife feed rate can only be adjusted in few fixed steps, each synchronous with the rotational speed of the knife, which severely limits the design possibilities of the Pacotizing process. In addition, the used gearboxes are cost and maintenance-intensive, and they usually only allow abrupt speed changes, which leads to high component loads.

From WO 97/36498 A1 a device is known for the production of food products with a mousse-like consistency, which eliminates the above-mentioned disadvantages of the soft ice cream machine of EP 0 062 805 A2. The design of the device is very similar to that of the soft ice cream machine mentioned above, but it does not have a gearbox but instead it utilizes a stepper motor to generate a feed motion of the blade shaft which rotates with the blade shaft and whose motor shaft forms the threaded spindle. While with this device, a knife feed is possible independently and asynchronously from the rotational speed of the blade shaft, the disadvantage here is that the electrical control of the stepper motor, which rotates together with the blade shaft, must be carried out via sliding contacts, which is complicated and requires a lot of maintenance. Another disadvantage of this design is that the stepper motor has to be reversed to move the blade shaft forward and backward, which can lead to increased component loads and to a jerky operation, in particular during a repeated Pacotizing mode in which the blade shaft is moved forward and backward intermittently.

From ES 1 071 424 U a device for producing a creamy or foamy food product from a food product base material in block form is known, in which the blade spindle is driven by a first motor and carried by a yoke which can be moved back and forth with two parallel threaded spindles with a second motor. In contrast to the soft ice cream machine shown in EP 0 062 805 A2, a knife feed is also possible with this device independently and asynchronously of the rotational speed of the blade shaft, however the disadvantage here is that the construction with the movable yoke is complex, structurally unstable and wear-intensive, not to mention that it requires a relatively large installation space. Another disadvantage of this design is that again the direction of rotation of the drive motor for the threaded spindles must be reversed in order to move the knife forward and backward, which can also lead to high component loads and jerky operation, especially during a repeated Pacotizing mode in which the blade shaft is moved forward and backward intermittently.

DISCLOSURE OF THE INVENTION

The object is therefore to provide technical solutions which do not have the disadvantages of the state of the art mentioned above or at least partially avoid them.

This object is achieved by the subject-matter of the independent patent claims.

According to these, a first aspect of the invention relates to a device for shredding, e.g., pureeing or pacotizing, of deep-frozen food products provided in block form. The device comprises a shredding device with a single- or multi-knife tool for shredding at least a part of the deep-frozen food products block. For this purpose, in the intended operation of the device, the tool of the shredding device is rotated around a preferably vertical axis of rotation and is thereby advanced along the axis of rotation in the direction towards the food products block such that it penetrates into the food products block while scraping off layers of food from the food products block. The tool is thereby preferably rotated at a rotational speed between 1000 rpm and 3000 rpm, the feed rate is preferably between 0.5 mm and 5 mm per second.

The shredding device comprises two drive motors that can be separately controlled, preferably electric motors, which serve to generate the rotational movement and the feed movement of the tool. At least one of these two motors is speed-variable, i.e. the rotational speed can be continuously varied at least within a certain speed range.

Further, the shredding device comprises a mechanical gear arrangement carrying the tool, which is coupled to the two drive motors and which, during the intended operation, generates both the rotational movement as well as the axial displacement movement of the tool from the drive rotations of these two motors. Only one of the two drive motors is thereby used for the rotational drive of the tool, while both drive motors together are used for the tool feed. For this purpose, the gear arrangement is designed in such a way that at set directions of rotations of the two drive motors and at a specific ratio of the number of revolutions of the two drive motors, the tool is rotated with the gear arrangement without being displaced axially along the axis of rotation, and that when the rotational speed ratio is exceeded or undercut, respectively, the tool is not only rotated, but it is additionally advanced or retracted along the axis of rotation, namely with an increasing speed as the rotational speed ratio is increasingly exceeded or undercut.

In the case of an axially stationary but rotating tool, both drive motors rotate at a certain (neutral) rotational speed ratio, and the advancing and retraction of the tool is effected by continuously changing this rotational speed ratio in one direction or the other as a result of a change in rotational speed of the at least one variable-speed drive motor and without any reversal of the direction of rotation of one of the drive motors.

In other words, the first aspect of the invention thus relates to a device for shredding of deep-frozen food products provided in block form, which comprises a shredding device with a tool which is rotated around an axis of rotation and thereby advanced towards the food products block, while scraping off layers of food from the block. The shredding device comprises two drive motors for generating the rotational and feed movement of the tool, which are separately controllable and at least one of which is variable speed. Further it comprises a gear arrangement which is coupled to the two drive motors and which is designed in such a way that only a first of the drive motors serves to drive rotation of the tool and that both drive motors together serve to feed the tool, in such a way that at a certain rotational speed ratio of the two drive motors the tool is rotated without performing an axial movement and, if this rotational speed ratio is exceeded or undercut, respectively, in addition to the rotational movement an advancing or retracting movement of the tool along the axis of rotation results, respectively.

With the device according to the invention, very fast but at the same time low-stress changes of feed direction are possible, and this with a very sensitive controllability of the feed rates.

In a preferred embodiment of the device according to the invention, the gear arrangement of the shredding device comprises a rotatable shaft carrying the tool, which is mounted in an axially displaceable manner and which can be rotated with the first drive motor, as well as a rotatable feed member arranged concentrically to this shaft, which is supported in an axially stationary manner and which can be rotated with the second drive motor. The shaft and the feed member are coupled to each other via a thread in such a way that a rotation of the feed member relative to the shaft causes an axial displacement of the shaft relative to the feed member and thus an axial displacement of the tool along its axis of rotation. This type of design allows relatively simple, robust solutions that in addition require little space.

In a first preferred embodiment, the shaft is designed as a hollow shaft, and the feed member is a concentric threaded spindle arranged therein, whose external thread engages in a corresponding internal thread in the hollow shaft.

In a second preferred embodiment, the shaft is designed as a central threaded spindle and the feed member as a feed nut arranged on this threaded spindle and engaging in its thread.

In a third preferred embodiment, the feed member is designed as a hollow shaft with internal thread, within which the shaft is arranged which engages in the internal thread of the hollow shaft with a corresponding external—thread formed on it.

Depending on the construction design of the device in accordance with the invention, one or another of these embodiments may be preferred.

It is advantageous that the first motor is connected by a toothed belt (first toothed belt according to the claims) to the shaft of the gear arrangement carrying the tool, and the second motor is also connected by a toothed belt (second toothed belt according to the claims) to the feed member. Such belt drives are inexpensive, quiet and low-wear, and they enable a slip-free coupling between the drive motor and the driven element.

The feed member, against which the shaft carrying the tool is axially abuts, is preferably supported in such a way that it can move away in the axial direction from the tool against the forces of a spring during axial overload. In this way a fatal "crash" under axial overload can be prevented within certain limits.

For embodiments in which the second motor is coupled to the feed member via a toothed belt, it is preferable that the maximum possible axial displacement of the feed member corresponds to at least two thirds of the width of the second toothed belt in the event of overload. This makes it possible to easily implement an automatic belt ejection function, which is particularly important in the event of a break of the toothed belt between the first drive motor and the shaft carrying the tool, as in this case it can happen that the latter mentioned shaft no longer rotates but is advanced very quickly, which then leads to a rapidly increasing axial overload.

Such a belt ejection function can be realized in different ways:

In a first preferred embodiment, the belt wheel on the feed member comprises a toothing on the side facing the feed member that is open towards this side. Above the toothed belt connecting the feed member to the second drive motor, there is a scraper device, e.g. a scraper bar, which retains this toothed belt in the event of an axial—displacement of the feed member under axial overload and thereby scrapes it off the belt wheel on the feed member in the direction towards the feed member.

In a second preferred embodiment, the belt wheel on the feed member comprises a run-up shoulder for the toothed belt on the side facing the feed member, while the belt wheel on the second drive motor has a toothing on the opposite side which is open towards this side, such that the toothed belt can run off the belt wheel on the second drive motor when the feed member is moved axially under axial overload.

In yet another preferred embodiment, the device according to the invention comprises a container with which, in the intended operation, the deep-frozen food products are provided as a block of food products frozen in the container and in which, in the intended operation, the shredding, e.g. pureeing or pacotizing, of at least part of the deep-frozen food products block is carried out with the shredding device. Such devices have proven to be particularly suitable for practical use.

In addition, the device is thereby preferably designed in such a way that the container can be pressurized with a gas, e.g. air, during the shredding of the frozen food products, in particular to an overpressure of at least 1 bar. In this way a more airy consistency of the shredded food products preparation can be achieved.

Furthermore, it is preferred that the two drive motors are stationary in relation to a support structure of the device. This eliminates the need for costly and wear-intensive power transmission and signal lines from stationary components to rotating components.

A second aspect of the invention relates to a method of operating the device according to the first aspect of the invention, in which the rotational speed of the at least one-variable speed drive motor is continuously varied during intended operation such that an intermittent forward and backward movement of the tool along the axis of rotation results. The advantages of the invention are particularly evident in such an operation, which can be used in particular during a repeated Pacotizing mode.

BRIEF DESCRIPTION OF THE DRAWINGS

Further advantages and applications of the invention result from the now following description based on the figures. Thereby show.

MODES FOR CARRYING OUT THE INVENTION

Figure 1:
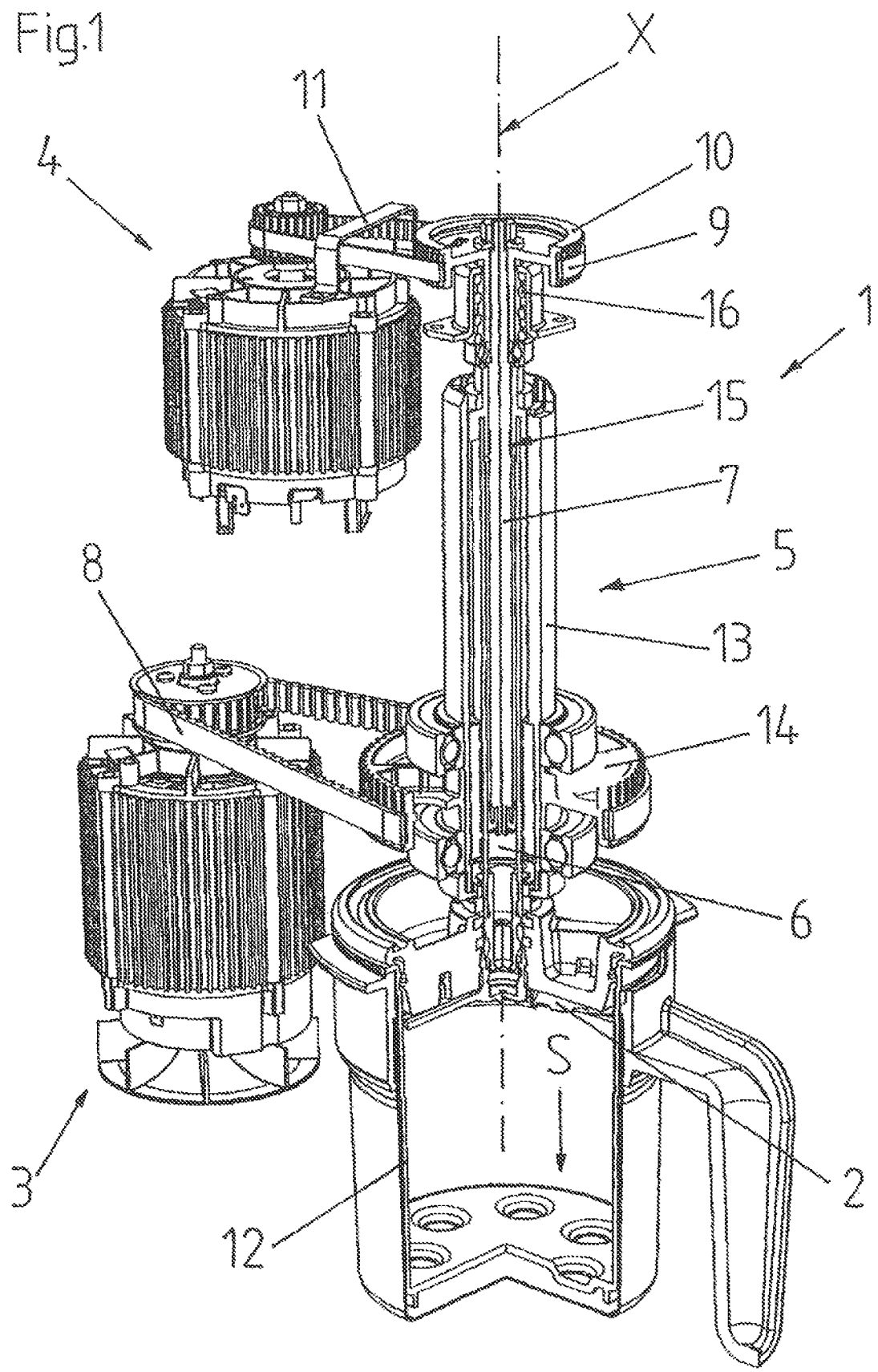
FIG. 1 a partially cut, perspective view of the shredding device of an device according to the invention.

FIG. 1 shows a partially cut, perspective view of the shredding device 1 of an device according to the invention, together with a container 12 arranged thereon in the intended operation position, by means of which in the intended operation the deep-frozen food products are—provided as a frozen block of food in the container 12 and in which in the intended operation the shredding, in particular pureeing or pacotizing, of at least a part of the deep-frozen food products block takes place with the shredding device 1.

In this device, the shredding of the deep-frozen food products provided in block form (not shown) is performed by rotating the multi-winged knife 2 (tool according to the claims) around a vertical axis of rotation X and thereby advancing along this axis of rotation X towards the food products block in the direction S, whereby it scrapes off fine layers from the frozen food products block.

As can be seen, the shredding device 1 has a first electric drive motor 3 and a second electric drive motor 4 for generating the rotational movement and for generating the feed movement of the knife 2. Both motors 3, 4 can be controlled separately, have variable speeds and are attached to a stationary support structure of the device (not shown). Furthermore, the shredding device 1 comprises a gear arrangement 5, which is coupled to the two drive motors 3, 4 and designed in such a way that only the first drive motor 3 serves to rotate the knife 2 and that both drive motors 3, 4 together serve to feed the knife.

For this purpose, the gear arrangement 5 has a rotatable hollow shaft 6 carrying the knife 2, which is mounted in an axially displaceable manner.

This hollow shaft 6 is arranged concentrically in an axially displaceable manner in an axially stationary, rotatably supported, longitudinally toothed drive sleeve 13, with whose longitudinal toothing it forms a rotational form-lock, such that the hollow shaft 6 can be rotated about the axis of rotation X via the drive sleeve 13 with the first drive motor 3. For this purpose, the drive sleeve 13 has a belt wheel 14 on its outer circumference, which can be driven by the first drive motor 3 via a toothed belt 8.

Concentrically arranged in the hollow shaft 6 is a threaded spindle 7 which is supported in an axially stationary manner and which can be rotated around the axis of rotation X with the second drive motor 4. For this purpose, the threaded spindle 7 has a belt wheel 10 at its free end, which can be driven via a toothed belt 9 with the second drive motor 4.

The hollow shaft 6 has an internal thread section 15 which engages in the external thread of the threaded spindle 7. The hollow shaft 6 and the threaded spindle 7 are thereby coupled together in such a way that a rotation of the threaded spindle 7 relative to the hollow shaft 6 causes an axial displacement of the hollow shaft 6 relative to the axially stationary threaded spindle 7. In other words, a difference in rotational speed between the hollow shaft 6 and the threaded spindle 7 causes the hollow shaft 6 to be lowered or raised along the axis of rotation X and thus causes the knife 2 to be advanced or retracted, respectively, with respect to the to-be-shredded food products block. At identical rotational speeds of hollow—shaft 6 and threaded spindle 7, the knife 2 is rotated without performing an axial movement along the axis of rotation X.

In other words, with set identical directions of rotation of the two drive motors 3, 4 and at a specific ratio of the number of revolutions of the two drive motors 3, 4, at which the rotational speeds of the hollow shaft 6 and the threaded spindle 7 are identical, the knife 2 is rotated without performing any axial movement along the axis of rotation X. If this specific rotational speed ratio is exceeded or undercut, an additional advancing or retracting movement, respectively, of the knife 2 along the axis of rotation X is generated, which increases or decreases in speed as the rotational speed ratio is exceeded or undercut, respectively.

As can be seen, the threaded spindle 7 is supported in such a way that, in the case of an axial overload, it can move against the forces of a spring 16 in an axial direction away from the knife 2. The maximum possible axial displacement under overload thereby corresponds to about one and a half times the width of the toothed belt 9.

Figure 2:
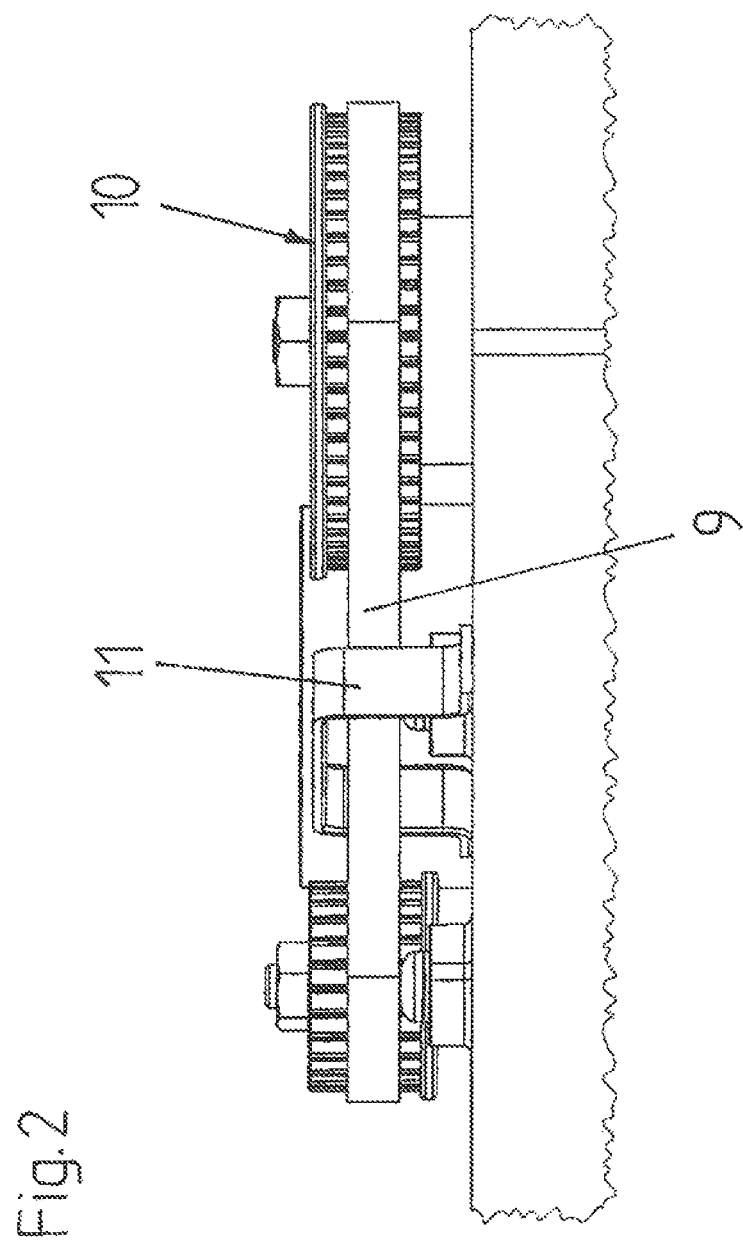
FIG. 2 an enlarged side view of the belt drive between the second drive motor and the feed member of the shredding device from FIG. 1.

As can be seen in particular in a synopsis with FIG. 2, which shows an enlarged side view of the belt drive between the second drive motor 3 and the threaded spindle 7, the belt wheel 10 of the threaded spindle 7 has open teeth on the side facing it. Above the toothed belt 9, there is a scraper bar 11 which retains the toothed belt 9 when the threaded spindle 7 moves axially upwards under axial overload, in which case the belt wheel 10 also moves upwards, and thereby scrapes it off the belt wheel 10.

While in the present application there are shown preferred embodiments of the invention, it should be clearly stated that the invention is not limited thereto and that it can be carried out in other ways within the scope of the following claims.

The invention claimed is:

1. A device for shredding, deep-frozen food products provided in block form, comprising a shredding device with a tool for shredding at least part of the deep-frozen food products block, by rotating the tool around a vertical axis of rotation (X) and thereby advancing along the axis of rotation (X) in a direction towards the food products block, thereby scraping off layers of food from the food products block, wherein the shredding device comprises a first drive motor and a second drive motor for rotating and advancing the tool, which drive motors are separately controllable and of which at least one is speed-variable and wherein the shredding device comprises a gear arrangement which is coupled to the first and second drive motors by first and second toothed belts and which is designed in such a way that only the first drive motor serves to drive the rotation of the tool and that the first and second drive motors together serve to advance or retract the tool, in such a way that at set directions of rotations of the first and second drive motors and at a specific ratio of the number of revolutions of the first and second drive motors, the tool is rotated without performing any axial movement along the axis of rotation (X), and that, if this specific rotational speed ratio is exceeded or undercut, respectively, an advancing or retracting movement of the tool along the axis of rotation (X) is generated, which advancing or retracting movement increases in speed with increasing exceeding or undercutting, respectively, of the rotational speed ratio.

2. The device according to claim 1, wherein the gear arrangement of the shredding device comprises a rotatable shaft carrying the tool, which is supported in an axially displaceable manner and which is rotatable with the first drive motor, and a rotatable feed member arranged concentrically to the rotatable shaft, which is supported in an axially stationary manner and which is rotatable with the second drive motor, wherein the rotatable shaft and the feed member are coupled to each other by means of a thread in such a way that a rotation of the feed member relative to the shaft causes an axial displacement of the shaft and the tool it carries with respect to the feed member and wherein the first motor is coupled to the rotatable shaft via a first toothed belt and wherein the second motor is coupled to the feed member via a second toothed belt.

3. The device according to claim 2, wherein the rotatable shaft is a hollow, and wherein the feed member is a concentric threaded spindle arranged therein.

4. The device according claim 3, wherein the first motor is coupled to the shaft via a first toothed belt and wherein the second motor is coupled to the feed member via a second toothed belt.

5. The device according to claim 3, wherein the feed member is supported in such a way that it can be displaced in the axial direction facing away from the tool against the forces of a spring in the event of an axial overload.

6. The device according to claim 2, wherein the feed member is supported in such a way that it can be displaced axially in a direction away from the tool against the forces of a spring in the event of an axial overload.

7. The device according to claim 2 wherein the maximum possible axial displacement of the feed member in the event of overload corresponds to at least two thirds of a width of the second toothed belt.

8. The device according to claim 7, wherein a belt wheel on the feed member comprises on the side facing the feed member a toothing open to this side and wherein above the second toothed belt a scraper device is present, which scrapes the second toothed belt from the belt wheel on the feed member at an axial displacement of the feed member in the axial direction away from the tool.

9. The device according to claim 1, wherein the device further comprises a container configured to hold the deep-frozen foods products block in the container and to enable the shredding of at the least a part of the deep-frozen food products block by means of the shredding device.

10. The device according to claim 9, wherein the device is designed in such a way that the container can be pressurized with a gas during the shredding of the deep-frozen food products.

11. The device according to claim 1, wherein the two drive motors are stationary with respect to a support structure of the device.

12. Method for operating the device according to claim 1, wherein the number of revolutions of the at least one variable-speed drive motor is varied continuously in such a way that an intermittent forward and backward movement of the tool along the axis of rotation (X) results.

* * * * *